J. S. WORTH.
FRICTION COUPLING.
APPLICATION FILED AUG. 5, 1920.
1,438,077.
Patented Dec. 5, 1922
2 SHEETS—SHEET 2.
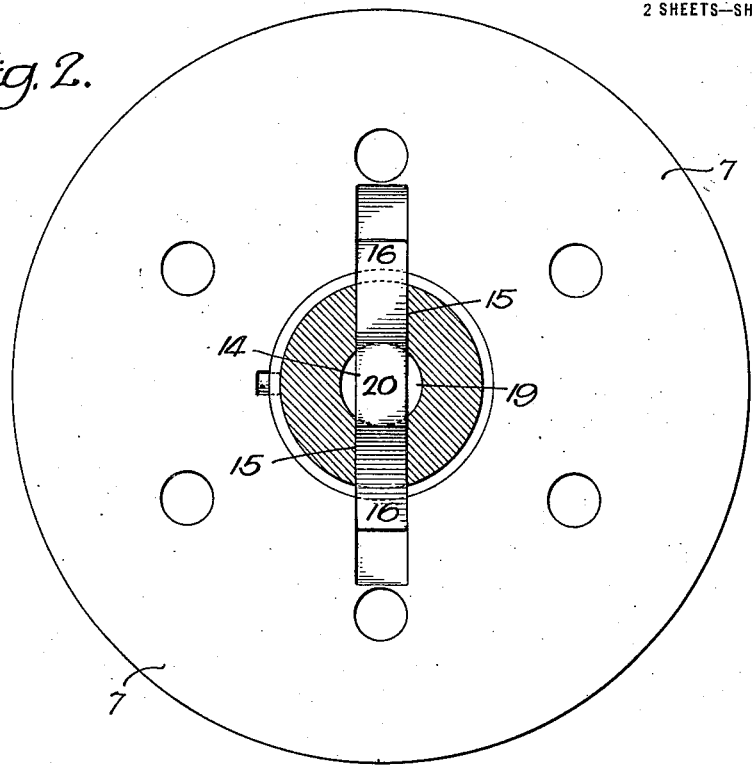
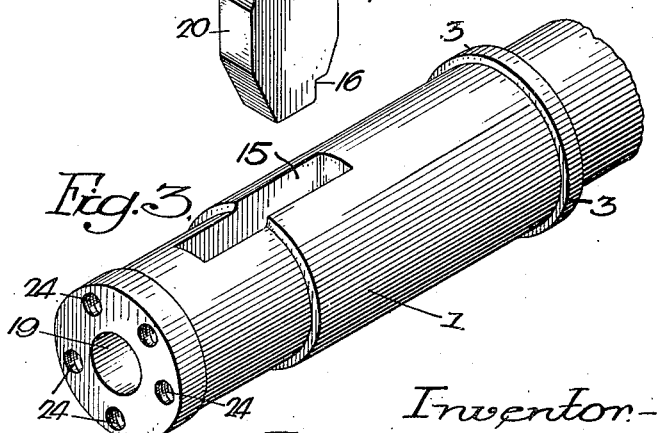
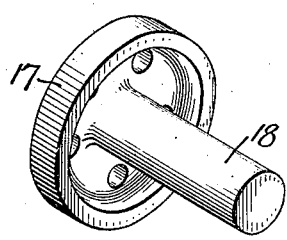
Inventor.-
John S. Worth.
by his Attorneys Patented Dec. 5, 1922.

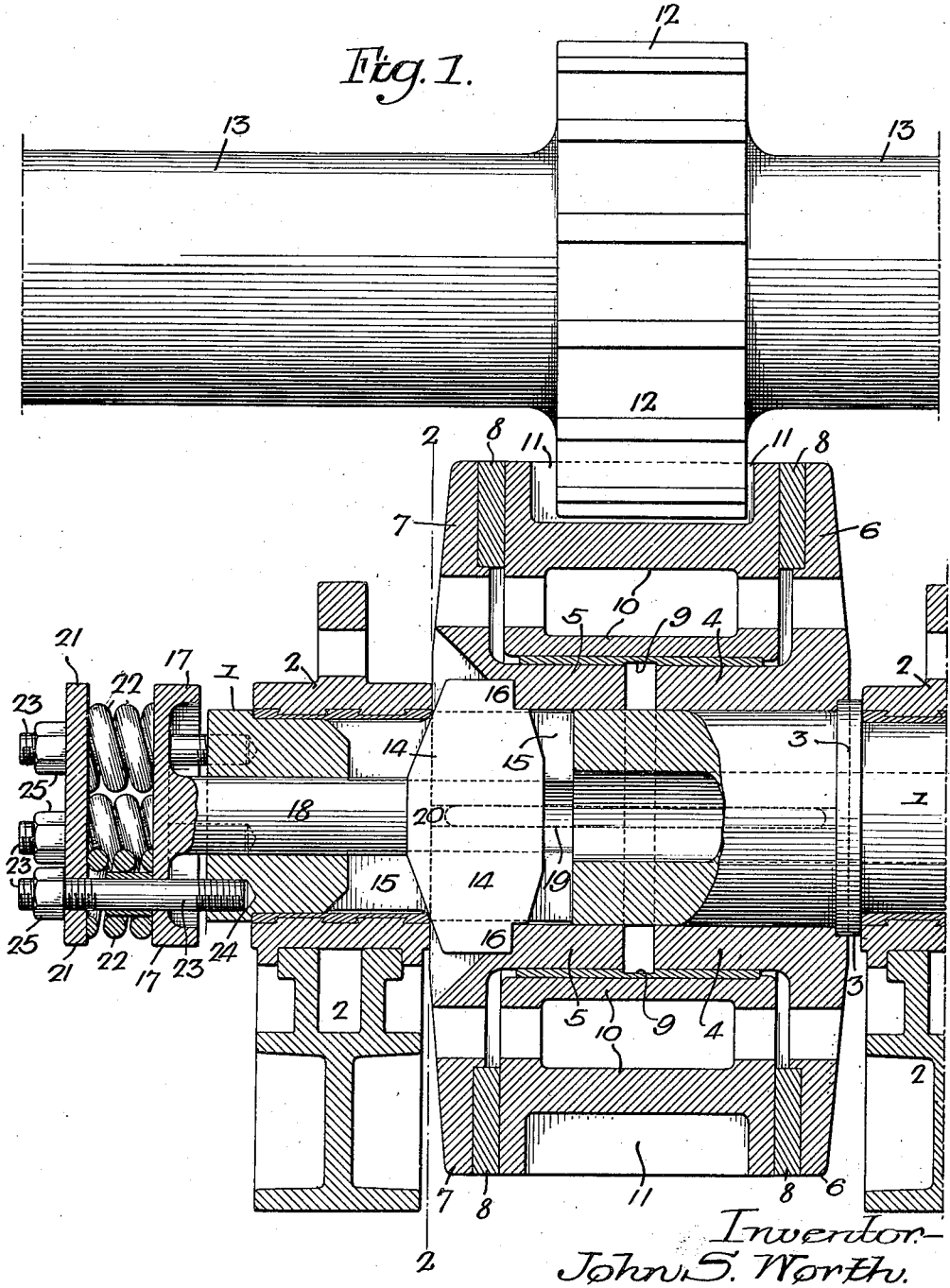

1,438,077

UNITED STATES PATENT OFFICE.

JOHN S. WORTH, OF COATESVILLE, PENNSYLVANIA, ASSIGNOR TO WORTH BROTHERS CORPORATION, OF CLAYMONT, DELAWARE, A CORPORATION OF DELAWARE.

FRICTION COUPLING.

Application filed August 5, 1920. Serial No. 401,422.

*To all whom it may concern:*

Be it known that I, JOHN S. WORTH, a citizen of the United States, residing in Coatesville, Pennsylvania, have invented certain Improvements in Friction Couplings, of which the following is a specification.

My invention relates to certain improvements in friction couplings, particularly those located between driving and driven members of heavy machinery.

The object of my invention is to construct the coupling so that it can properly transmit the power and to provide means by which it can be readily adjusted and can be dismantled without interfering with the driving member.

In the accompanying drawings:

Fig. 1 is a sectional view of my improved friction coupling;

Fig. 2 is a sectional view on the line 2—2, Fig. 1;

Fig. 3 is a detached perspective view illustrating a portion of the shaft on which the coupling is mounted;

Fig. 4 is a perspective view of the key; and

Fig. 5 is a view of the spindled disk which presses upon the key.

1 is a shaft adapted to bearings 2—2 of any suitable construction. This shaft is provided with an integral collar 3, which rests against one of the bearings 2, as shown in Fig. 1. Mounted on the shaft 1 are two hubs 4 and 5. The hub 4 is a fixed hub and is recessed to receive a portion of the collar 3. The hub 5 is spaced from the hub 4 so as to allow it to move to and from the hub 4, when desired. The two hubs are keyed to the shaft, as shown by dotted lines in Fig. 1, so that they will turn positively with the shaft. The hub 4 has a flange 6 and the hub 5 has a flange 7. These flanges are recessed to receive the friction rings 8, which are of any suitable material. Surrounding the two hubs 4 and 5 is a bushing 9 and mounted on this bushing is a driving member 10 with which the rings 8 come in contact. On the periphery of this driving member are gear teeth 11, which mesh with a gear wheel 12 on a driving shaft 13 so that a positive motion is imparted to the driving member 10, while the shaft 1 is driven through the two hubs from the driving member by friction. The teeth 11 of the driven member are wider than the teeth of the gear wheel 12 so as to allow a certain lateral movement of the driving member to take up the wear.

In order to regulate the friction of the coupling, I provide a key 14, which is shaped as shown in Fig. 4, and which is adapted to a slot 15 in the shaft 1. This slot is of sufficient length to allow for an independent longitudinal movement of the key. The key is notched at each end to form a shoulder 16 which bears against the hub 5. Beyond the end of the shaft 1 is a disk 17 having a spindle 18, which extends into an opening 19 in the end of the shaft and bears upon the portion 20 of the key 14.

21 is a plate and mounted between the plate and the disk are five coiled springs 22. Extending through openings in the plate and disk and through each spring is a stud bolt 23 screwed into threaded openings 24 in the ends of the shaft. These stud bolts are provided with nuts 25, on adjusting which more or less pressure can be applied through the springs, disk, spindle and wedge 14 to the hub 5 so that when it is desired to increase the friction all that is necessary is to turn the nuts in one direction. When it is desired to reduce the friction, the nuts are turned in the opposite direction.

By this construction, it will be seen that the spring mechanism and the adjusting mechanism are on the outside of the coupling and on the end of the driven shaft, so that they are easily accessible for adjustment. Furthermore, by removing the plates and disks, withdrawing the spindle and removing one of the bearings, the key can be detached and the parts separated when it is desired to renew the friction surfaces.

By the above construction, it will be seen that I provide a friction coupling located between a driven and a driving shaft by which the driven shaft will be turned under ordinary loads and which, when the load is too great, will slip.

The invention is especially adapted for use where the driven shaft is connected to a device, which may also be driven by another driving means and slippage is necessary.

I claim:

1. The combination in a friction coupling, of a shaft; a collar thereon, said shaft being slotted; a key mounted in the slot and projecting beyond each side of the shaft; a disk on the end of the shaft; a spindle extending from the disk through an opening in the shaft and bearing upon the key; a plate; springs mounted between the plate and the disk; stud bolts projecting from the end of the shaft and extending through the disk and plate and having nuts thereon by which the plate can be adjusted; two flanged hubs mounted on the shaft between a shaft collar and the key; and a driven member located between the flanges of the hub.

2. The combination in a friction coupling, of a shaft; a collar thereon, said shaft being slotted; a key mounted in the slot and projecting beyond each side of the shaft; a disk on the end of the shaft; a spindle extending from the disk through an opening in the shaft and bearing upon the key; a plate; springs mounted between the plate and the disk; stud bolts extending between the plate and the disk and having nuts thereon by which the plate can be adjusted; two hubs mounted on the shaft between the collar and the key and arranged to turn with the shaft, each hub having an annular flange; friction rings mounted on the flanges; a driven member mounted on the hubs and having friction surfaces opposite the friction rings.

JOHN S. WORTH.